US012560145B2

(12) United States Patent
Ladpli et al.

(10) Patent No.: US 12,560,145 B2
(45) Date of Patent: Feb. 24, 2026

(54) WIND TURBINE BLADE, WIND TURBINE, METHOD FOR FABRICATION OF A WIND TURBINE COMPONENT AND METHOD FOR FABRICATION OF A WIND TURBINE BLADE

(71) Applicant: Siemens Gamesa Renewable Energy A/S, Brande (DK)

(72) Inventors: Purim Ladpli, Bangkok (TH); Michael Nauheimer, Aalborg (DK); Mogens Nielsen, Aalborg (DK); Wei Sun, Gistrup (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/024,351

(22) PCT Filed: Sep. 7, 2021

(86) PCT No.: PCT/EP2021/074547
§ 371 (c)(1),
(2) Date: Mar. 2, 2023

(87) PCT Pub. No.: WO2022/053449
PCT Pub. Date: Mar. 17, 2022

(65) Prior Publication Data
US 2023/0313776 A1 Oct. 5, 2023

(30) Foreign Application Priority Data

Sep. 14, 2020 (EP) ..................................... 20196007

(51) Int. Cl.
*F03D 1/06* (2006.01)
*F03D 80/30* (2016.01)

(52) U.S. Cl.
CPC ........... *F03D 1/0675* (2013.01); *F03D 80/30* (2016.05); *F05B 2230/21* (2013.01); *F05B 2240/85* (2020.08)

(58) Field of Classification Search
CPC ...... F03D 1/0675; F03D 80/30; F03D 80/301; F05B 2240/85
See application file for complete search history.

(56) References Cited

U.S. PATENT DOCUMENTS 7,651,320 B2 * 1/2010 Hansen .................. H02G 13/00
416/1
8,191,255 B2 * 6/2012 Kristensen ............ F03D 1/0675
29/889
(Continued)

FOREIGN PATENT DOCUMENTS

EP 2 110 552 A1 10/2009
EP 1 664 528 B1 12/2010
(Continued)

OTHER PUBLICATIONS

International Search Report and Written Opinion for PCT/EP2021/074547 issued on Jan. 3, 2022.

*Primary Examiner* — Nathaniel E Wiehe
*Assistant Examiner* — Jason G Davis
(74) *Attorney, Agent, or Firm* — Schmeiser, Olsen & Watts LLP

(57) ABSTRACT

A wind turbine blade is provided including at least one laminate structure, and at least one connection terminal element, wherein the laminate structure includes a panel core embedded between at least one first laminate layer and at least one second laminate layer, wherein the connection terminal element is arranged in a corresponding opening of the panel core between the first laminate layer and the second laminate layer, wherein the connection terminal element includes at least one first connection portion con- (Continued)

nected to an embedded electrical conductor embedded in the laminate structure and/or at least one second connection portion adapted to be connected to at least one further electrical conductor arranged outside of the laminate structure.

15 Claims, 9 Drawing Sheets

(56)                    References Cited

U.S. PATENT DOCUMENTS

| | | | |
|---|---|---|---|
| 10,697,441 B2 * | 6/2020 | Klein | F03D 1/0675 |
| 2018/0180032 A1 | 6/2018 | Klein et al. | |

FOREIGN PATENT DOCUMENTS

| | | |
|---|---|---|
| EP | 3 511 560 A1 | 7/2019 |
| WO | 2020/103990 A1 | 5/2020 |

* cited by examiner

FIG 1

WIND TURBINE BLADE, WIND TURBINE, METHOD FOR FABRICATION OF A WIND TURBINE COMPONENT AND METHOD FOR FABRICATION OF A WIND TURBINE BLADE

CROSS-REFERENCE TO RELATED APPLICATIONS

This application claims priority to PCT Application No. PCT/EP2021/074547, having a filing date of Sep. 7, 2021, which claims priority to EP Application No. 20196007.7, having a filing date of Sep. 14, 2020, the entire contents both of which are hereby incorporated by reference.

FIELD OF TECHNOLOGY

The following relates to a wind turbine blade comprising at least one laminate structure and at least one connection terminal element, wherein the laminate structure comprises a panel core embedded between at least one first laminate layer and at least one second laminate layer. Furthermore, the following relates to a wind turbine, a method for fabrication of a wind turbine component and a method for fabrication of a wind turbine blade.

BACKGROUND

Wind turbines are prone to be hit by lightning strikes and therefore require a lightning protection system for conducting a current induced by a lightning strike from the wind turbine blades to the ground. Therefore, in an interior of a wind turbine blade, a down conductor may be arranged. This down conductor may be connected to portions of the shell of the wind turbine blade, so that a lightning strike hitting the shell of the wind turbine blade is guided into the down conductor. The down conductor and further conductors for the connections between the down conductor and the portions of the shell of the wind turbine blade may be integrated into the structure of the wind turbine blade.

The integration of the down conductor and/or of the further conductors in the interior of the wind turbine blade may occur by integrating cables in the structure of the wind turbine blade prior to the casting process of the wind turbine blade. This may require various cable-to-cable connections and several patch laminate layers to integrate the cables within the layers of the wind turbine blade structures making the manufacturing process of the wind turbine blade complex and difficult to be proceeded in an efficient way.

From EP 1 664 528 B1, a method of lightning-proofing a blade for a wind-energy plant is known. The blade comprises a shell with at least one fibre-reinforced principle laminate with conductive fibres, wherein the blade comprises at least one lightning arrester configured for conducting lightning current to ground. The conductive fibres are connected to the down conductor using electrically conductive connection elements.

SUMMARY

An aspect relates to an improved wind turbine blade, in particular a wind turbine blade which comprises an improved connection to an embedded electrical conductor.

This problem is solved by a wind turbine blade as initially described, wherein the connection terminal element is arranged in a corresponding opening of the panel core between the first laminate layer and the second laminate layer, wherein the connection terminal element comprises at least one first connection portion connected to an embedded electrical conductor embedded in the laminate structure and/or at least one second connection portion adapted to be connected to at least one further electrical conductor arranged outside of the laminate structure.

The laminate structure of the wind turbine blade comprises a panel core embedded between at least one first laminate layer and at least one second laminate layer forming a sandwich panel. The panel core comprises an opening corresponding to the at least one connection terminal element, so that the connection terminal element may be arranged in the opening of the panel core. This allows for embedding also the connection terminal element at least partly between the first laminate layer and the second laminate layer of the laminate structure. The panel core may comprise a plate-like structure, in particular with a curved and/or straight shape and it may consist of at least one insulating material like balsa wood and/or a solidified foam.

The connection terminal element may comprise at least one first connection portion, which is connected to the at least one electrical conductor that is embedded also in the laminate structure. Additionally, or alternatively, the connection terminal element may comprise at least one second connection portion, which is adapted to be connected, or which is connected, respectively, to at least one further electrical conductor arranged outside of the laminate structure. The thickness of the connection terminal element may be smaller in the first connection portion than in the second connection portion, so that a smooth integration of the connection terminal element in the laminate structure is possible with an embedded electrical conductor connected to the first connection portion.

This allows for creating an electrical connection to an embedded electrical conductor embedded in the laminate structure by connecting the further electrical conductor to the second connection portion of the connection terminal element and hence for creating a connection between the further electrical conductor outside of the laminate structure to the embedded electrical conductor in the laminate structure. This combination of the embedded connection terminal element and the further electrical conductor arranged outside of the laminate structure allows for creating electrical connections in particular in a lightning protection system of the wind turbine blade comprising the at least one embedded electrical conductor.

Providing a connection terminal element with a second connection portion enables the usage of further electrical conductors, which are not embedded in the structure of the wind turbine blade and therefore may be connected to the connection terminal element after a fabrication of the blade.

It is also possible that the further electrical conductors or at least a part of the further electrical conductors are connected to the connection terminal element, in particular when the further electrical conductors are arranged in locations with limited space in an interior of the wind turbine blade complicating their integration after casting of the blade, as it might occur for instance in a tip region of the blade.

The further electrical conductors may be connected for instance to pre-casted wind turbine blade components, like a spar, a web and/or a portion of a shell of the wind turbine blade prior to the casting of the entire wind turbine blade. A further electrical conductor arranged prior to the casting of the wind turbine blade may be covered for instance at least partly by an additional laminate layer like a glass fibre ply to keep it place and to allow for an easy repair of the further electrical conductor.

Compared to lightning protection systems, which comprise various embedded electrical conductors connected by embedded cable-to-cable connections, a usage of patch laminate layers for integrating the conductors and/or the connections of the wind turbine blade during a fabrication process can be avoided. Furthermore, unlike an embedded electrical conductor, the further electrical conductor arranged outside of the laminate structure does not affect a fatigue strain limit of the wind turbine blade. Therefore, a reduction of allowable fatigue strains due to integrated conductors used for establishing connections in the wind turbine blade may be avoided, since the connections may be provided by the further electrical conductors arranged outside of the laminate structure and therefore without inflicting the fatigue strain limits of the wind turbine blade.

Embedded connections between a plurality of embedded electrical conductors require a comparable large spanwise and/or chordwise distance, in particular when the conductors are connected using clamped connections clamping one conductor to another. This need for space may be reduced using the further electrical conductors connected to the connection terminal elements. Furthermore, additionally embedded electrical conductors, and in particular their connections, may negatively affect a flatness of the laminate structure, which may lead to wrinkling of the laminate layers of the laminate structure. Since at least a part of the further electrical conductors may be post-implemented after the casting, an effect of the electrical connection provided at the connection terminal element on a shell laminate wrinkling may be minimized.

The usage of one or more further electrical conductors outside of the laminate structures for connecting one or more connection terminal elements embedded in the laminate structure provide the additional advantage that the further electrical conductors are easily repairable after damage, since they may be removed from the second connection portion of one or more of the connection terminal elements and replaced by another further electrical conductor. A repair of such a further electrical conductor may be necessary for instance after a lightning strike that caused damage to the electrical connections in the wind turbine blade. In traditional wind turbine blade designs, which comprise lightning cables integrated into the structures, the lightning cables may not be repaired after damage due to their integration into the structures of the wind turbine blade.

At least some or all of the further electrical conductors may be integrated after the fabrication of the wind turbine blade, which increases the blade production efficiency by avoiding the complex cable connections prior to the casting. Therefore, a fabrication process of the wind turbine blade may be facilitated, since the complex arrangement of connections between the components of the wind turbine blade during the casting process, in particular in areas with a limited access for an operator, may be reduced. Additionally, the connection terminal elements may be used to provide connections close to joining regions, for instance between spanwise split pre-cast parts of the wind turbine blade facilitating electrical connections over the joining regions. In addition, the usage of the connection terminal elements and the further conductors in the wind turbine blade may reduce the amount of cables required in the wind turbine blade further facilitating for instance a mould packaging process during a fabrication of the wind turbine blade and reducing the risk of a failure of an electrical connection during fabrication.

The arrangement of the connection terminal elements in the panel core of the laminate structure has the advantage that a positioning of the first laminate layer and/or the second laminate layer during a fabrication process of the wind turbine blade may be done without any interruption and mechanical stress concentration in the area of the connection terminal element since which may be smoothly integrated into the panel core due to the arrangement in the corresponding opening. The first laminate layer and/or the second laminate layer may each comprise an opening in the area of the second connection portion of the connection terminal element, so that a further electrical conductor may be connected to the connection terminal element.

The wind turbine blade may comprise a plurality of connection terminal elements, in particular a plurality of connection terminal elements each comprising at least one corresponding second connection portion, so that a plurality of connections between different connection terminal elements may be provided by connecting further electrical conductors to the second connection portions of the plurality of connecting terminal elements. The connection terminal elements may be made from an electrically conductive material, for instance a metal.

In an embodiment of the invention, the embedded electrical conductor is an elongated cable-like conductor and/or a conductive fibre layer and/or the embedded electrical conductor is arranged between the panel core and the first laminate layer or the second laminate layer of the laminate structure. An arrangement of the embedded electrical conductor between the panel core and the first laminate layer or the second laminate layer, respectively, of the laminate structure facilitates the connection of the embedded electrical conductor to the connection terminal element, which is also arranged between the first laminate layer and the second laminate layer.

The embedded electrical conductor may be an elongated cable-like conductor, for instance a litz-wire cable, which is connected to a further component of the wind turbine blade, in particular during a casting process of the wind turbine blade, so that the connection terminal element is suitable to provide an electrical connection to this further component via the embedded electrical conductor. It is also possible that the embedded electrical conductor is a conductive fibre layer, for instance a layer of carbon fibres integrated in the laminate structure of the wind turbine blade.

In an embodiment, the embedded electrical conductor is connected to a lightning receptor and/or an at least partly conductive portion of a shell of the wind turbine blade and/or to a spar of the wind turbine blade and/or the embedded electrical conductor is a ground conductor of a lightning arrester of the wind turbine blade. This allows for usage of the connection terminal element to provide all necessary electrical connections to a ground conductor of a lightning arrester, or a down conductor, respectively, of the wind turbine blade. The embedded electrical conductor connected to the first connection portion of the connection terminal element may be connected to a lightning receptor located for instance on an outer shell surface of the wind turbine blade.

Also, an at least partly conductive portion of a shell, for instance a conductive carbon fibre laminate and/or an equal potential connection arranged for instance in a shell of the wind turbine blade, may be connected to the connection terminal element directly or by an embedded electrical conductor. Also, a connection of an embedded electrical conductor between the connection terminal element and a spar, in particular a spar cap, is possible. Additionally, or alternatively, a ground connection may be provided by an embedded electrical conductor used as a ground conductor of the wind turbine blade and at least one connection terminal element. This allows in particular for a plurality of connection terminal elements of the wind turbine blade, which establish a connection between lightning receptors, and/or partly conductive portions of the shell of the wind turbine blade, to be integrated in a lightning protection system of the wind turbine blade, or of a wind turbine, respectively. The connection terminal elements may be connected using the further electrical conductors arranged outside of the laminate structures. It is possible that an embedded electrical conductor used as a ground conductor is connected to a connection terminal element arranged at a root-side end of the wind turbine blade, so that via a further electrical conductor an electrical connection to a further ground conductor at the hub of the wind turbine and therefore an integration of the blade in a lightning protection circuit of a wind turbine becomes possible.

In an embodiment, the laminate structure forms at least a portion of a shell of the wind turbine blade and/or at least a portion of a web structure arranged in an interior of the wind turbine blade. An embedded electrical conductor arranged in the web structure may be in particular a ground conductor of a lightning arrester of the wind turbine blade providing an electrical connection in particular from a tip-side end of the wind turbine blade to a root-side end of the wind turbine blade. Embedded electrical conductors in a laminate structure, that forms at least a part of a shell of the wind turbine blade, may provide electrical connections to lightning receptors arranged on an outer surface of the wind turbine blade shell and/or to conductive portions of the shell of the wind turbine blade, for instance to equipotential connections provided by a conductive carbon fiber layer in the laminate structure of the shell.

In an embodiment of the invention, the panel core comprises at least one tilted recess adjacent to the opening, wherein a portion of the embedded electrical conductor is arranged in the tilted recess. By providing the tilted recess, a stress in the embedded electrical conductor can be reduced by guiding the embedded electrical conductor through the tilted recess and to the first connection portion of the connection terminal element during a fabrication of the wind turbine blade. Furthermore, a wrinkling of the first laminate layer and/or the second laminate layer may be minimized in the area around the connection terminal element since at least a portion of the embedded electrical conductor is inserted in the tilted recess. The tilted recess in the panel may be arranged in particular adjacent to the first connection portion of the connection terminal element. It is also possible that a plurality of tilted recesses are arranged adjacent to a plurality of first connection portions of the connection terminal element.

In an embodiment, the opening in the panel core is a recess or a through-hole. It is in particular possible that the opening in the panel core, in which the connection terminal element is arranged, is a recess in a panel of a laminate structure which forms at least a part of a shell of the wind turbine blade. An opening in the panel core of a laminate structure, which forms at least a portion of a web structure of the wind turbine blade, may be a recess or a through-hole.

In an embodiment of the invention, a panel core spacer component is arranged in the opening adjacent to the connection terminal element, wherein the thickness of the panel core spacer component and at least a portion of the connection terminal element is equal or essentially equal to the thickness of the panel core between the first laminate layer and the second laminate layer. This allows a flush-mounted or at least a partially flush-mounted arrangement of the connection terminal element in the panel core of the laminate structure, so that the first layer and/or the second layer of the laminate structures are only minimally influenced by the presence of the connection terminal element during a fabrication process of the wind turbine blade. The usage of the panel core spacer component allows to provide additional material in the opening of the panel core, so that a thickness difference between a thicker panel core and a thinner connection terminal element, in particular to a second connection portion of the connection terminal element, may be equalized.

In an embodiment, the second connection portion comprises at least one spacer element protruding from the second connection portion at least through the first laminate layer and/or the second laminate layer, wherein the spacer element is adapted to be connected to the further electrical conductor. The provision of the spacer element protruding from the second connection portion at least to the first laminate layer or the second laminate layer facilitates a connection of the further electrical conductor to the connection terminal element. The first laminate layer and/or the second laminate layer may each comprise an opening through which the spacer element protrudes, so that a connection of the further electrical conductor to the spacer element and hence to the connection terminal element is easily possible. The opening for the spacer element may be created either during the casting of the wind turbine blade or after the casting, for instance by drilling a hole through the first laminate layer and/or the second laminate layer after casting of the wind turbine blade.

In an embodiment, the embedded electrical conductor is fixed to the first connection portion of the connection terminal element by a bolted connection and/or the second connection portion is adapted to be connected to the further electrical conductor by a bolted connection. The usage of bolted connections between the embedded electrical conductor and the first connection portion of the connection terminal element and/or between the further connector and the second connection portion of the connection terminal element facilitates the production of the wind turbine blade, since bolted connections may be applied easily.

Furthermore, the provision of a bolted connection between the further electrical conductor and the second connection portion facilitates a repair procedure, in which one or more of the further electrical conductors have to be replaced. The first connection portion and/or the second connection portion may each comprise at least one threaded hole, so that the embedded electrical conductor and/or the further electrical conductor may be connected to the first connection portion and/or the second connection portion, respectively, using one or more screws and/or one or more washers or the like.

In an embodiment, the first connection portion and the second connection portion are arranged on the same side of the connection terminal element or one or more first connection portions and/or one or more second connection portions are arranged on two opposing sides of the connection terminal element. By providing one or more first connection portions and/or one or more second connection portions on the same side of the connection terminal element, both the embedded electrical conductor and the further electrical conductor may be attached to the connection terminal element from the same side. This may be for instance suitable for connection terminal elements arranged in a shell of the wind turbine blade, so that both the embedded electrical conductor and the further electrical conductor may be connected to the connection terminal elements from an interior side of the shell of the wind turbine blade.

An arrangement of one or more first connection portions and/or one or more second connection portions on two opposing sides of the connection terminal element allows for connecting one or more embedded electrical conductors and/or one or more further electrical conductors from two sides of the laminate structure, hence both from the side of the first laminate layer and from the side of the second laminate layer. This is in particular useful for connection terminal elements arranged in a web structure of the wind turbine blade, so that by these connection terminal elements, electrical connections via the further electrical conductors may be provided to both sides of the web structure. In particular, electrical connection may be provided to both chambers adjacent to the web structure, or to a leading-edge panel structure and/or a trailing edge panel structure of the wind turbine blade shell. Also, a usage in multi-web wind turbine blades, which comprise more than one web structure, is possible allowing for electrical connection throughout the interior of the blade. By the provision of one or more first connection portions and/or more second connection portions on the same surface, or on two opposing sides of the connection terminal elements, one sided, or two sided, respectively, connection terminal elements are provided.

In an embodiment, on at least one side of the connection terminal element, a first connection portion is arranged between two second connection portions or a second connection portion is arranged between two first connection portions. An arrangement of a first connection portion between two second connection portions allow for instance to provide a connection terminal element to a middle section of an embedded electrical conductor, which is attached to the first connection portion. Electrical connections using the further electrical conductors may then be established to the two second connection portions, which are arranged adjacent to the first connection portion and hence adjacent to the embedded electrical conductor connected to the first connection portion. Depending on the orientation of the embedded electrical conductor connected to the first connection portion, horizontal and/or vertical connections to the embedded electrical conductor become possible.

By providing a second connection portion between two first connection portions, the connection terminal element may be connected to the end section of two embedded electrical conductors, which are each connected to one of the first connection portions. A second connection portion may be connected to a further electrical conductor, so that the connection terminal element provides an electrical connection between the two embedded electrical conductors and a further electrical conductor connected to the second connection portion. This allows for connecting two embedded electrical conductors to each other and to one or more of the further electrical conductors.

A wind turbine according to embodiments of the invention comprises at least one wind turbine blade according to embodiments of the invention.

All details and advantages mentioned previously in connection with the wind turbine blade according to embodiments of the invention apply correspondingly to the wind turbine according to embodiments of the invention.

A method for fabrication of a wind turbine component according to embodiments of the invention comprises the steps:
  providing at least one panel core, at least one first laminate layer, at least one second laminate layer and at least one connection terminal element,
  arranging the at least one connection terminal element in a corresponding opening of the panel core,
  arranging the first laminate layer and the second laminate layer on two opposing sides of the panel core embedding the at least one connection terminal element at least partly,
  casting of the wind turbine component.

In an embodiment, the connection terminal element comprises at least one first connection portion connected to an embedded electrical conductor embedded in the laminate structure and/or at least one second connection portion adapted to be connected to at least one further electrical conductor arranged outside of the laminate structure.

In an embodiment of the method for fabrication of a wind turbine component, an embedded electrical conductor is provided, wherein the embedded electrical conductor is connected to a first connection portion of the connection terminal element and arranged between the panel core and the first laminate layer and/or the second laminate layer prior to the casting of the wind turbine component.

In an embodiment, the wind turbine component is a part of a shell and/or a spar and/or a web.

A method for fabrication of a wind turbine blade according to embodiments of the invention comprises the steps:
  providing at least one panel core, at least one first laminate layer, at least one second laminate layer and at least one connection terminal element, arranging the at least one connection terminal element in a corresponding opening of the panel core, and arranging the first laminate layer and the second laminate layer on two opposing sides of the panel core at least partly embedding the at least one connection terminal element, and/or providing at least one pre-casted wind turbine component comprising at least one connection terminal element, in particular fabricated in a method for fabrication of a wind turbine component according to embodiments of the invention,
  casting of the wind turbine blade.

In an embodiment, an embedded electrical conductor is provided, wherein the embedded electrical conductor is connected to a first connection portion of the connection terminal element and arranged between the panel core and the first laminate layer and/or the second laminate layer prior to the casting of the wind turbine blade.

In an embodiment, a further electrical conductor is provided, wherein the further electrical conductor is connected to at least one second connection portion of a connection terminal element prior to or after the casting of the wind turbine blade. The further electrical conductor may be connected in particular to one or more pre-casted components, which are fabricated prior to the casting of the wind turbine blade.

In an embodiment, a method for fabrication of a wind turbine blade according to embodiments of the invention may comprise the steps:
  providing at least one panel core, at least one embedded electrical conductor, at least one first laminate layer, at least one second laminate layer and at least one connection terminal element,
  arranging the at least one connection terminal element in a corresponding opening of the panel core, connecting the embedded electrical conductor to a first connection portion of the connection terminal element, arranging the first laminate layer and the second laminate layer on two opposing sides of the panel core embedding the embedded electrical conductor, casting of the wind turbine blade, connecting at least one further electrical conductor to a second connection portion of the connection terminal element.

In an embodiment of the method according to the invention, at least one pre-casted component is provided and arranged with respect to the panel core, wherein after casting of the wind turbine blade, the second connection portion of the connection terminal element of the pre-casted component is connected to the or a further electrical conductor. This allows for providing at least a part of the wind turbine blade, for instance a web structure, as a pre-casted component and for integrating it into an electrical system, in particular a lightning protection system, of the wind turbine blade using the connection terminal element of the pre-casted component as well as the connection terminal element provided during the casting process of the wind turbine blade, in particular within a laminate structure forming a shell of the wind turbine blade.

All advantages and details mentioned in conjunction with the wind turbine blade according to embodiments of the invention apply correspondingly to the method for fabrication of a wind turbine blade component according to embodiments of the invention and to the method for fabrication of a wind turbine blade according to embodiments of the invention.

BRIEF DESCRIPTION

Some of the embodiments will be described in detail, with reference to the following figures, wherein like designations denote like members, wherein:

FIG. 1 shows an embodiment of a wind turbine according to embodiments of the invention;

DETAILED DESCRIPTION

Figure 1:
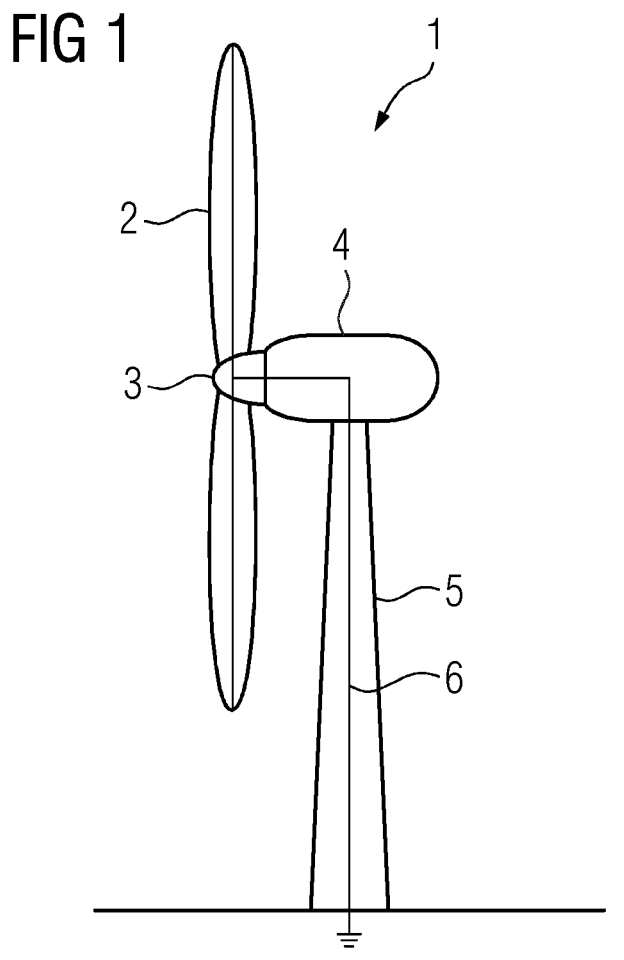
Figure 2:
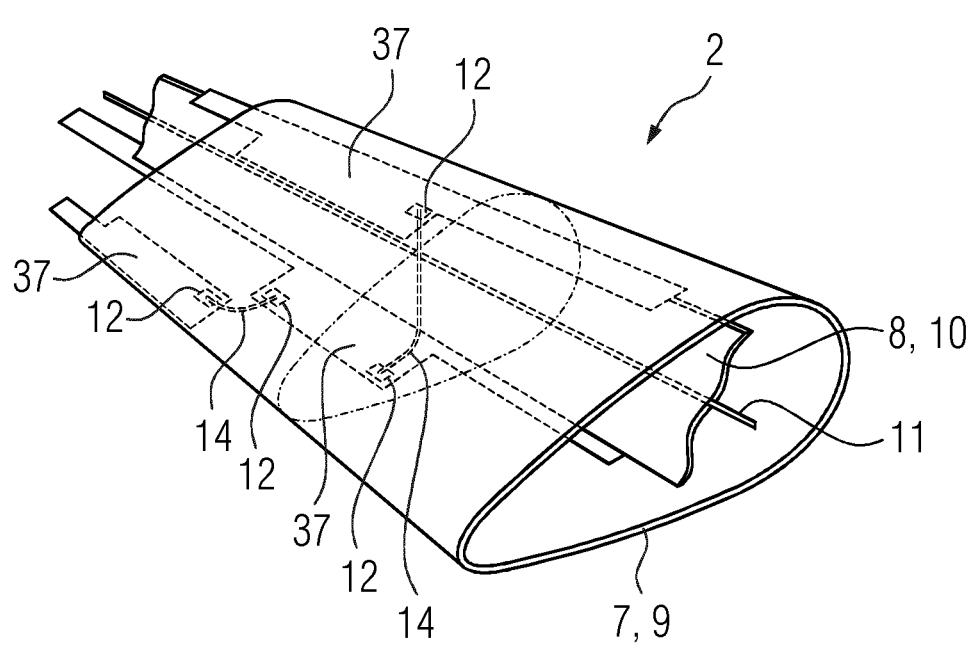
FIG. 2 shows a partially cut view of an embodiment of a wind turbine blade according to embodiments of the invention.

In FIG. 1, a wind turbine 1 is shown. The wind turbine 1 comprises a plurality of wind turbine blades 2 mounted to a hub 3 of the wind turbine 1. The hub 3 is attached to a nacelle 4, which is mounted on a tower 5 of the wind turbine 1.

The wind turbine 1 further comprises a lightning protection system 6, which comprises a plurality of conductors for grounding of a lightning strike hitting the wind turbine 1, for instance in one of the wind turbine blades 2. For providing electrical connections, in particular in the wind turbine blade 2, a plurality of conductors are arranged connecting different components or portions of the wind turbine blades 2 to each other and to further conductors of the lightning protection system 6.

In FIG. 2, a cut view of a wind turbine blade 2 is shown. The wind turbine blade 2 comprises two laminate structures 7, 8, wherein the laminate structure 7 forms a shell 9 of the wind turbine blade and the laminate structure 8 forms at least a portion of a web structure 10, or a shear web, respectively, of the wind turbine blade 2. The web structure 10 of the wind turbine blade 2 is arranged in an interior of the wind turbine blade 2 surrounded by the shell 9 of the wind turbine blade 2. The web structure 10 comprises one or more embedded electrical conductors embedded in the laminate structure 8 of the web structure 10 forming a ground conductor 11 of a lightning arrester of the wind turbine blade 2, which may be integrated in the lightning protection system 6 of the wind turbine 1.

Both in the laminate structure 7 of the shell 9 and the laminate structure 8 of the web structure 10, one or more connection terminal elements 12 are provided. The connection terminal elements 12 are used for establishing electrical connections between the embedded electrical conductors forming the ground conductor 11 in the web structure 10 and conductive portions 37 of the shell 9 and/or lightning receptors arranged on an outer surface of the shell 9. Also, a connection to a spar of the wind turbine blade 2, in particular to a spar cap of the wind turbine blade 2, is possible. The conductive portions 37 may be for instance conductive fibre layers used for providing equipotential connections in the shell 9 of the wind turbine blade 2. The connection terminal elements 12 are connected by further electrical conductors 14, which are arranged outside of the laminate structures 7, 8.

Figure 3:
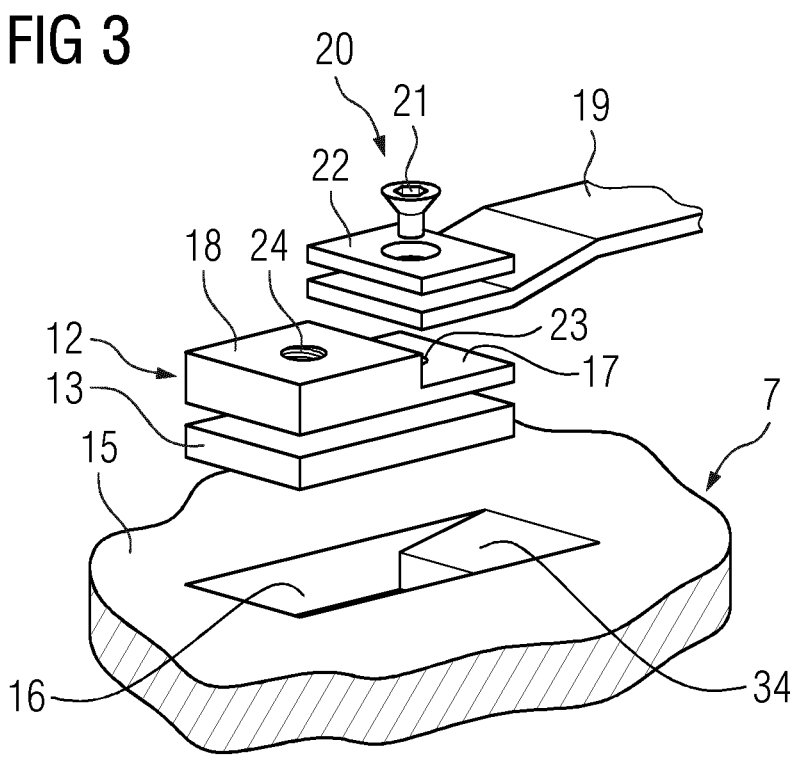
FIG. 3 shows an exploded view of a detail of a wind turbine blade according to embodiments of the invention.

In FIG. 3, a detail of the wind turbine blade is shown in an exploded view depicting the arrangement of a connection terminal element 12 in a panel core 15 of the laminate structure 7 forming a portion of the shell 9 of the wind turbine blade 2. The panel core 15 comprises an opening 16, wherein in the opening 16 the connection terminal element 12 and a panel core spacer component 13 are arranged. The opening 16 is provided as a through-hole, wherein a difference in the thickness of the connection terminal element 12 and the panel core 15 is compensated by the panel core spacer component 13. It is possible that the opening 16 in the panel core 15 is provided as a recess which may allow for omitting the panel core spacer component 13. Adjacent to the opening 16, the panel comprises a tilted recess 34. The connection terminal element 12 may comprise or consist of an electrically conductive material, for instance a metal like bronze, copper or aluminium. The spacer element 13 may be fabricated out of an electrically insulating material, for instance of a material corresponding to the material of the panel core 15, in particular a solidified foam and/or balsa wood.

The connection element 12 comprises a first connection portion 17 and a second connection portion 18. The first connection portion 17 is connected to an embedded electrical conductor 19, which is also embedded in the laminate structure 7. The embedded electrical conductor 19 is arranged in the tilted recess 34 to reduce an internal mechanical stress, in particular in the end portion of the embedded electrical conductor 19 connected to the first connection portion 17.

The embedded electrical conductor 19 may be for instance a cable-like conductor, in particular a litz-wire cable, connected to a lightning receptor and/or to an at least partially conductive portion of the shell 9 of the wind turbine blade 2. Also, a direct connection of the connecting element 12 to a spar cap and/or an electrically conductive portion of the shell, for instance a pre-casted carbon profile, a pultruded carbon profile and/or a fibre mat comprising electrically conductive fibres like carbon fibres integrated in the laminate structure 7, is possible.

The embedded electrical conductor 19 is connected to the connection terminal element 12 by a bolted connection 20 comprising a screw 21 and a washer 22. The first connection portion 17 of the connection terminal 12 comprises a threaded hole 23, in which the screw 21 may be fixated.

The second connection portion 18 comprises a threaded hole 24, so that the second connection portion 18 is adapted to be connected to a further electrical conductor 14, which is arranged outside of the laminate structure 7. The threaded hole 24 may also be provided after casting of the wind turbine blade 2 and prior to the connection of the further electrical conductor 14 to the connection terminal element 12. The threaded hole 24 may be provided for instance by drilling into the connection terminal element 12 and a first laminate layer 25 and/or a second laminate layer 26 covering the connection terminal element 12.

The thickness of the connection terminal element 12 is larger in the second connection portion 18 than in the first connection portion 17, so that a smooth integration of the connection terminal element 12 in the panel core 15 is possible. The usage of the further electrical conductors 14 has the advantage that the further electrical conductors 14 are not influencing a fatigue strain limit of the wind turbine blade 2 resulting in particular in a more flexible wind turbine blade 2.

Figure 4:
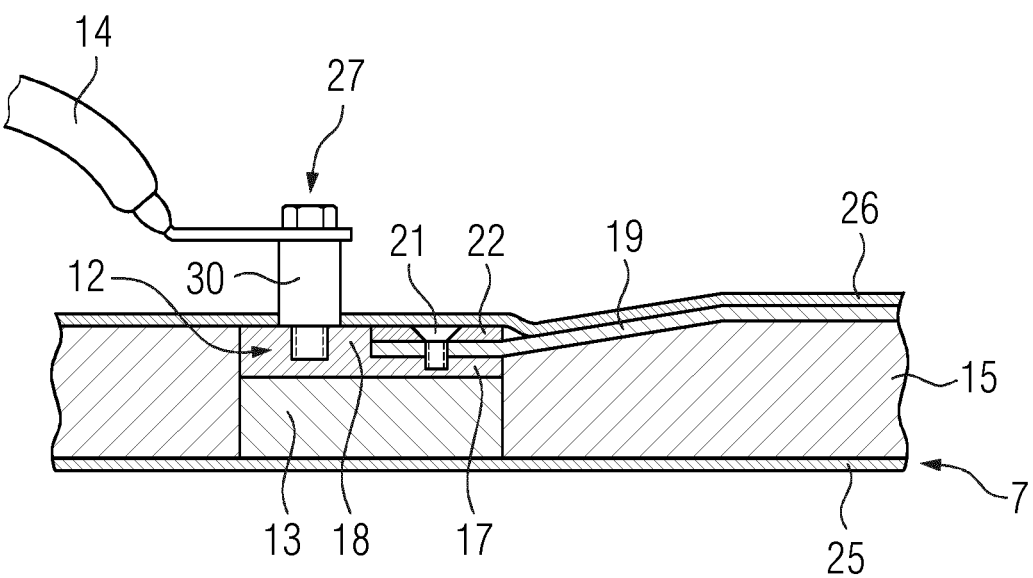
FIG. 4 shows a side view of a detail of a wind turbine blade according to embodiments of the invention.

In FIG. 4, a sideview corresponding to the exploded view in FIG. 3 is shown, wherein additionally a first laminate layer 25 and a second laminate layer 26 of the laminate structure 7 are shown. Furthermore, the further electrical conductor 14 connected to the second connection portion 18 of the connection terminal element 12 is depicted. The panel core 15 is arranged between the first laminate layer 25 and the second laminate layer 26 of the laminate structure 7. The first laminate layer 25 and the second laminate layer 26 are arranged on opposing sides of the panel core 15 forming a sandwich-structure. The embedded electrical conductor 19 is arranged between the panel core 15 and the second laminate layer 26. The further electrical conductor 14 is fixed by a bolted connection 27 to the second connection portion 18 of the connection terminal element 12.

Figure 5:
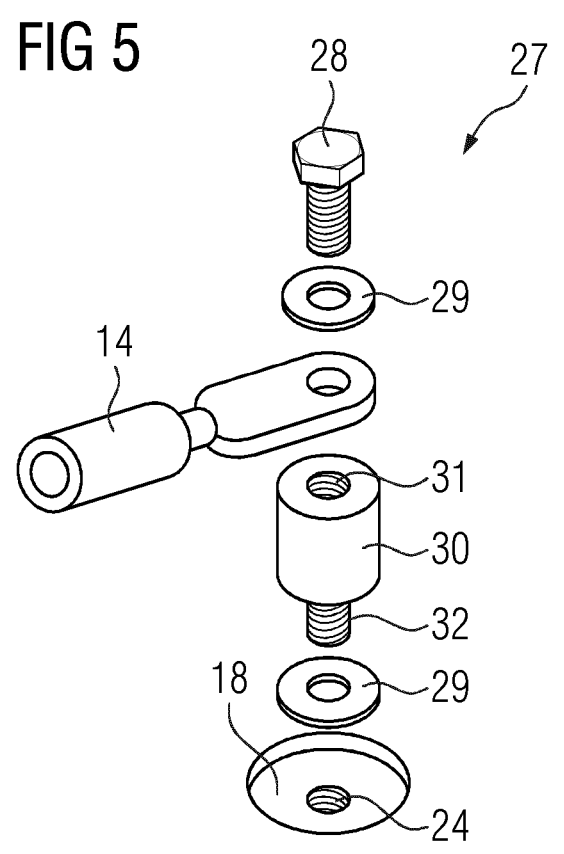
FIG. 5 shows an exploded view of a connection of a further electrical connector to a connection terminal element.

In FIG. 5, an exploded view of the bolted connection 27 connecting the further electrical conductor 14 to the second connection portion 18 of the connection terminal element 12 is shown. The bolted connection 27 comprises a screw 28, two washers 29 and a spacer element 30, which are used to fixate the further electrical conductor 14 to the threaded hole 24 of the second connection portion 18 of the connection terminal element 12. The spacer element 30 therefore comprises also a threaded hole 31 and a screw portion 32, wherein the screw 28 is used to fixate the further electrical conductor 14 in the threaded hole 31 of the spacer element 30. The screw portion 32 of the connection spacer element 30 is then used to fixate the further electrical conductor 14 to the threaded hole 24 of the second connection portion 18 of the connection terminal element 12. Alternatively, the spacer element 30 may be hollow, for instance a sleeve, so that the screw 28 may be screwed directly into the threaded hole 24 of the connection terminal element 12.

As can be seen from FIG. 4, the spacer element 30 protrudes from the second laminate layer 26 of the laminate structure 7, in which the connection terminal element 12 is integrated. The second laminate layer 26 comprises a hole, through which the spacer element 30 protrudes.

Figure 6:
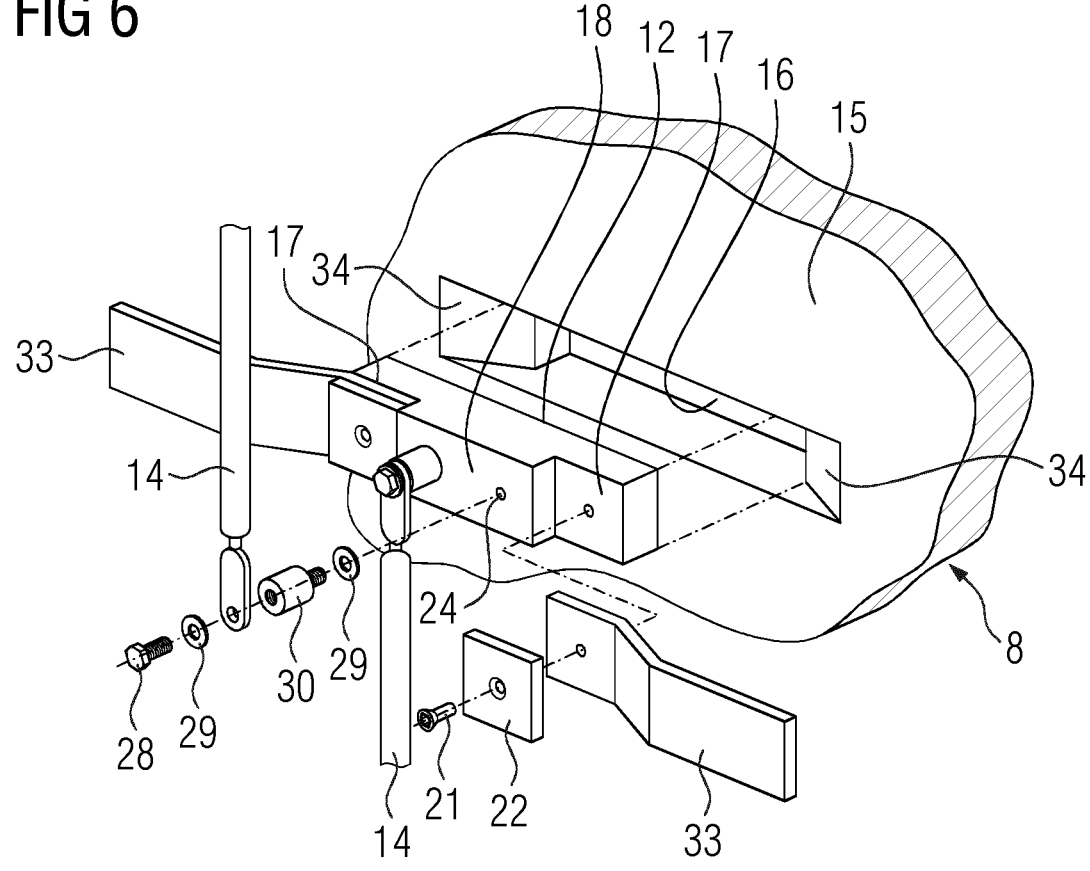
FIG. 6 shows an exploded view of a detail of a wind turbine blade according to embodiments of the invention.

In FIG. 6 a detail of a wind turbine blade 2 is shown in an exploded view depicting a connection terminal element 12 arranged in a panel core 15 of the laminate structure 8 that forms at least a portion of the web structure 10 of the wind turbine blade 2. The connection terminal element 12 comprises two first connection portions 17 and one second connection portion 18 arranged in between the two connection portions 17. To each of the first connection portions 17, an embedded electrical conductor 33 of the web structure 10 is connected. With the embedded electrical conductors 33, the ground conductor 11 of the web structure 10 may be formed by connection of a two or more embedded electrical conductors 33 using one or more connection terminal elements 12 arranged in the laminate structure 8 of the web structure.

The opening 16 in the panel core 15 comprises two tilted recesses 34 arranged adjacent to the opening 16 and adjacent to the first connecting portion 17 of the connection terminal element 12. The connection terminal element 12 comprises two threaded holes 24 enabling the connection of two further electrical conductors 14 to the connection terminal element 12. The connection of the further electrical conductors 14 correspond to the connection described in conjunction with FIG. 5.

Figure 7:
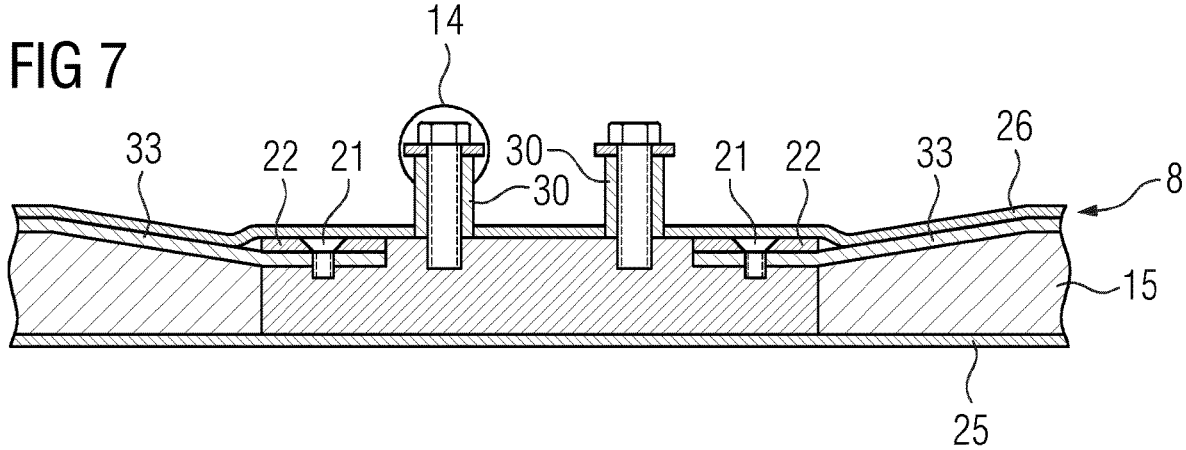
FIG. 7 shows a side view of a detail of a wind turbine blade according to embodiments of the invention.
Figure 8:
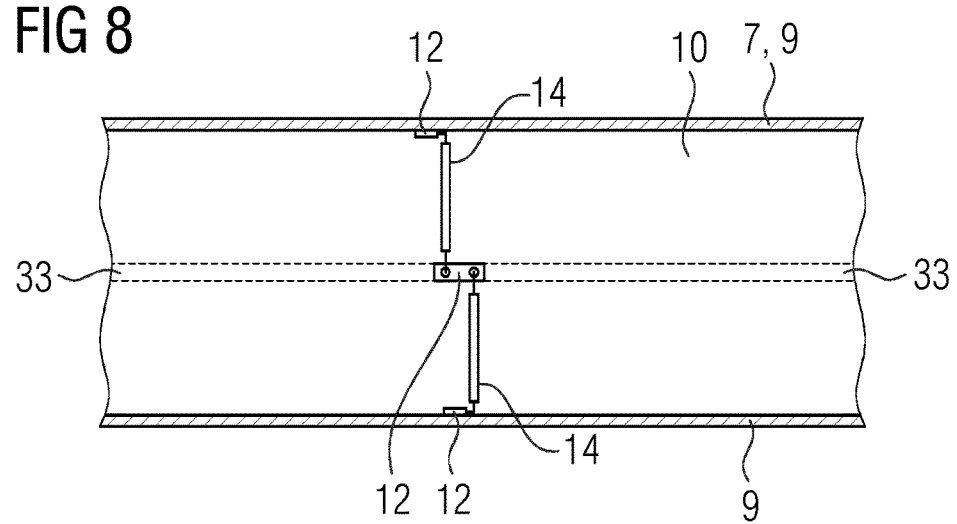
FIG. 8 shows a detail of a web structure of a wind turbine blade according to embodiments of the invention.

In FIG. 7, a sideview of the exploded view from FIG. 6 is shown additionally depicting the first laminate layer 25 and the second laminate layer 26 of the laminate structure 8. As shown in FIG. 8, the connection terminal element 12 as depicted in FIG. 6 may be used to provide a horizontal connection for the embedded electrical conductors 33 of the web structure 10, to which for instance vertically two further electrical conductors 14 are arranged each contacting a further connection terminal element 12 arranged in the shell 9 of the wind turbine blade 2.

Figure 9:
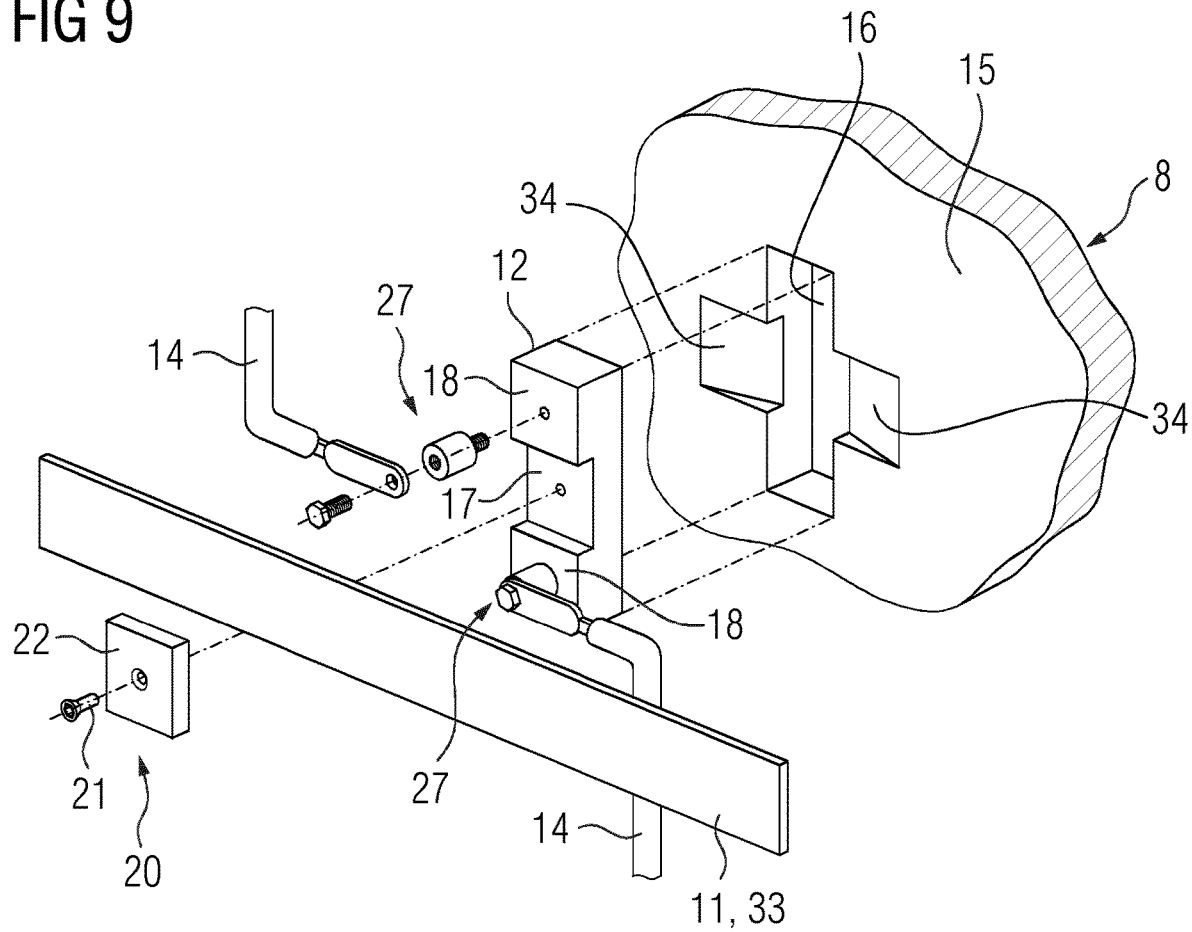
FIG. 9 shows an exploded view of a detail of a wind turbine blade according to embodiments of the invention.

In FIG. 9, a detail of a wind turbine blade 2 is shown in an exploded view depicting a connection terminal element 12 arranged a laminate structure 8 forming at least a portion of the web structure 10 of the wind turbine blade 2. The panel core 15 comprises an opening 16 with two tilted recesses 34 adjacent to the opening 16 and adjacent to the first connection portion 18 of the connection terminal element 12. In this embodiment of a connection terminal element 12, the first connection portion 17 is arranged in between two second connection portions 18. The first connection portion 18 is connected to the embedded electrical conductor 33 forming at least a part of the ground conductor 11, wherein connection occurs via the bolted connection 20 as previously described. To the second connection portions 18, each a further electrical connector 14 is connected each by a bolted connection 27 as described in conjunction with FIG. 5.

Figure 10:
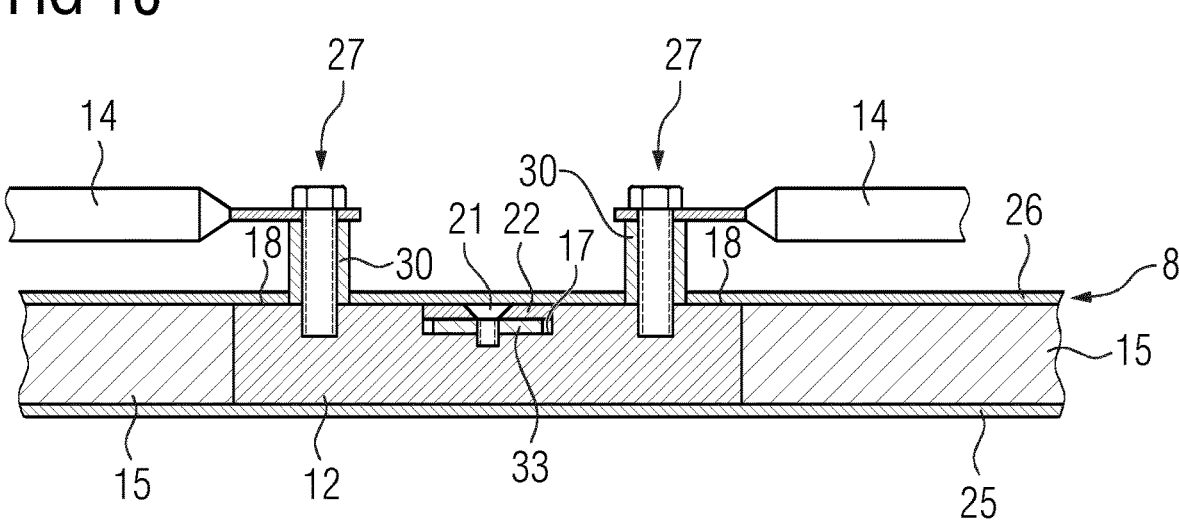
FIG. 10 shows a side view of a detail of a wind turbine blade according to embodiments of the invention.
Figure 11:
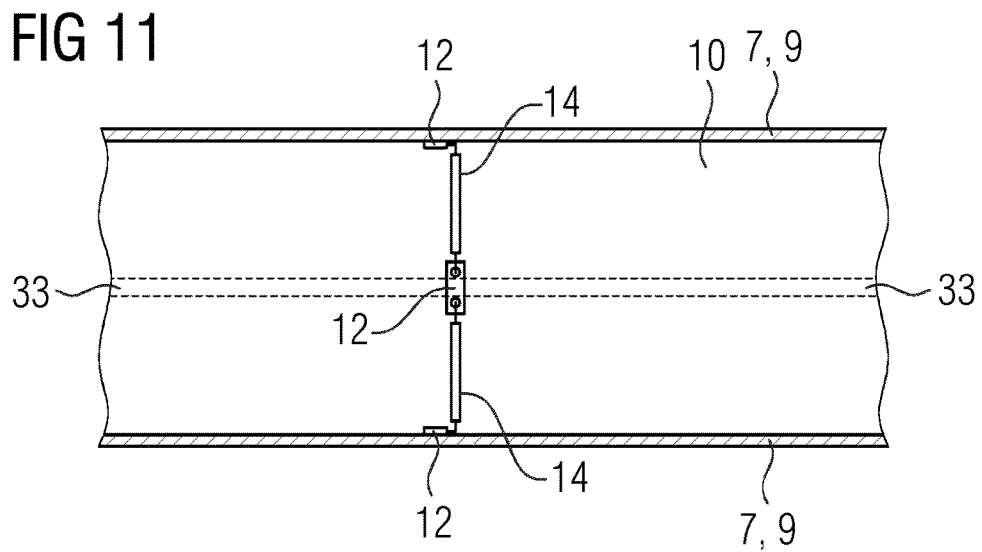
FIG. 11 shows a side view of a web structure of a wind turbine blade according to embodiments of the invention.

In FIG. 10, the corresponding sideview to the exploded view in FIG. 9 is shown, wherein additionally the first laminate layer 25 and the second laminate layer 26 of the panel structure 8 are depicted. In FIG. 11, a corresponding sideview of the wind turbine blade 2 is shown, in which the connections of the two further electrical conductors 14 to each a connection terminal portion 12 in the shell 9 of the wind turbine blade 2 are depicted.

Figure 12:
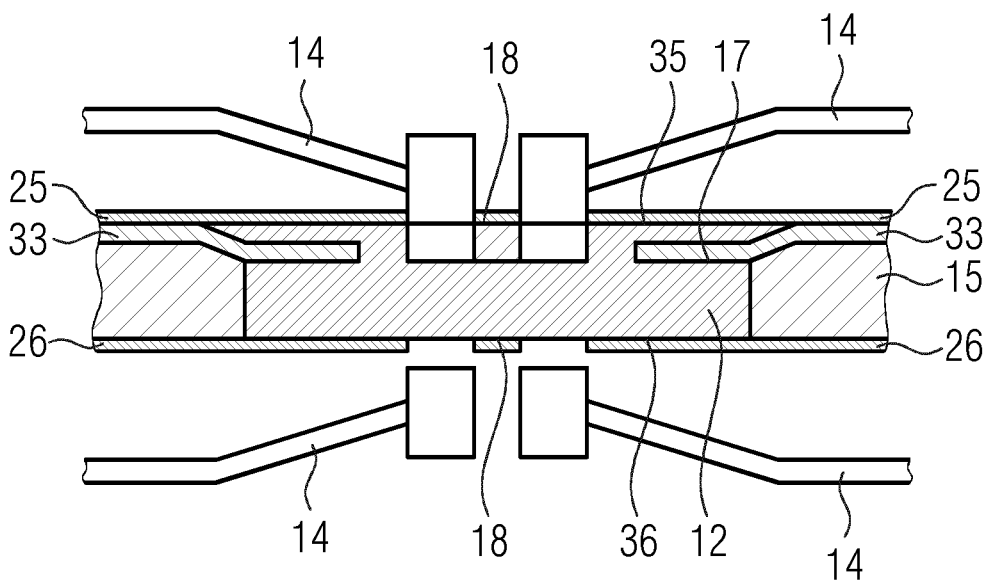
FIG. 12 shows a cut view of a detail of a wind turbine blade according to embodiments of the invention.

In FIG. 12, a connection terminal element 12 comprising two first connection portions 17 and one second connection portion 18 arranged on a first side 35 of the connection terminal element 12 is shown. Furthermore, the connection terminal element 12 comprises a further second connection portion 18, which is arranged on a second side 36 of the connection terminal element 12, which is opposing the first side 35 of the connection element 12. This allows to connect further electrical conductors 14 to both sides 35, 36 of the connection terminal element 12 and therefore in particular to both sides of a web structure 10 comprising the connection terminal element 12. The connection terminal element 12 further allows for connecting the two embedded electrical conductors 33 on the same side 35 using the two first connection portions 17.

Figure 13:
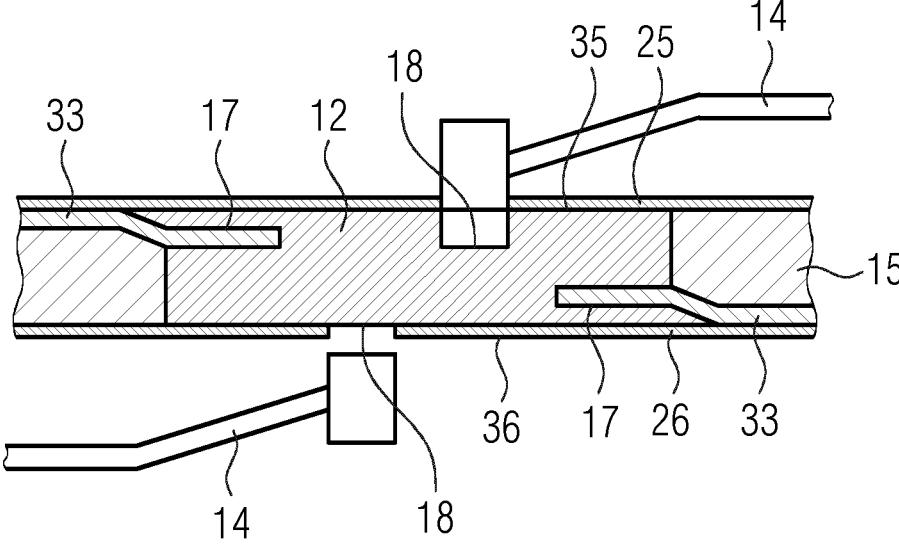
FIG. 13 shows a cut view of a detail of a wind turbine blade according to embodiments of the invention.

In FIG. 13, a connection terminal element 12 is shown, which comprises on the first side 35 and on the second side 36 each a first connection portion 17 and a second connection portion 18. This connection terminal element 12 allows for a connection to an embedded electrical conductor 33 and the further electrical conductor 14 on each of the sides 35, 36 of the connection terminal element 12. This connection terminal element 12 may also be used in particular in a web structure 10 of a wind turbine blade 2 allowing connections to both sides of the web structure 10, hence to both chambers of the blade 2 divided by the web structure 10. Also, a usage in a wind turbine blade 2 comprising multiple web structures 10 is possible.

It shall be noted that the embodiments of the connection terminal element 12 described each in relation for the web structure 10 or for the shell 9 of the wind turbine blade 2, respectively, may also be used differently, hence also the connection terminal elements 12 described in conjunction with the web structure 10 may be used in the shell 9 and vice versa. It is also possible that the connection terminal element 12 only comprises one or more first connection portions 17 so that it may be used for establishing a connection to one or more embedded conductors 19, 33, in particular for establishing a connection between a plurality of embedded conductors 19, 33. Alternatively, the connection terminal element 12 may comprise only one or more second connection portions 17 so that it may be used for establishing a connection to one or more further electrical conductors 14, in particular for establishing a connection between a plurality of further electrical conductors 14. A wind turbine blade 2 may comprise one or more of the different connection terminal elements 12 described in the foregoing.

Figure 14:
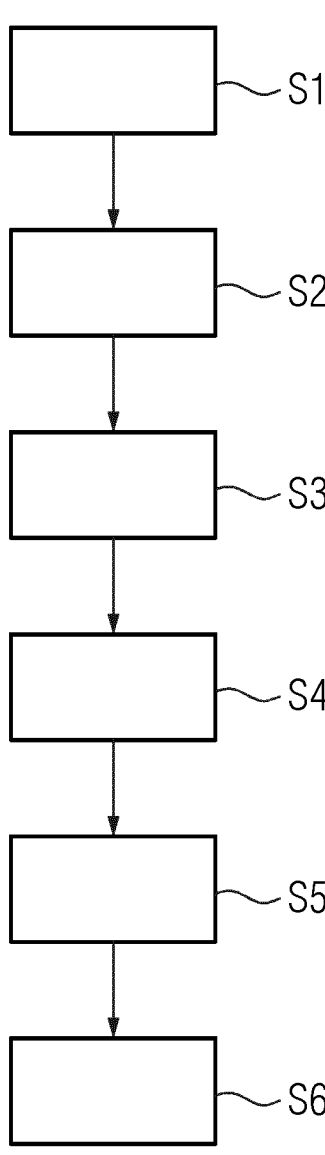
FIG. 14 shows a flow diagram of a method for fabrication of a wind turbine blade according to embodiments of the invention.

In FIG. 14, a flow diagram of a method for fabricating a wind turbine blade 2 according to embodiments of the invention is depicted.

In a first step S1, at least one panel core 15, at least one embedded electrical conductor 19, 33, at least one first laminate layer 25, at least one second laminate layer 26 and at least one connection terminal element 12 are provided.

In step S2, the at least one connection terminal element 12 is arranged in the corresponding opening 16 of the panel core 15.

In step S3, the embedded electrical conductor 19, 33 is connected to the first connection portion 17 of the connection terminal element 12.

In step S4, the first laminate layer 25 and the second laminate layer 26 are arranged on two opposing sides of the panel core 15 embedding the embedded electrical conductor 19, 33 and/or the connection terminal element 12.

Additionally, or alternatively to the provision of the at least one panel core 15, the at least one embedded electrical conductor 19, 33, the at least one first laminate layer 25, the at least one second laminate layer 26 and the at least one connection terminal element 12, at least one pre-casted wind turbine component may be provided. The pre-casted wind turbine component may be casted prior to the fabrication of the wind turbine blade 2 in a separate fabrication method.

The method for fabrication of the wind turbine component may comprise steps S1 to S4 as previously described. The casting of the wind turbine component occurs in an additional step subsequent to step S4. The at least one pre-casted wind turbine component used for the fabrication of the wind turbine blade 2 may be a web, a spar, in particular a spar cap, and/or a portion of a shell 9 of the wind turbine blade 2.

In step S5, the wind turbine blade 2 is casted, for instance in a resin infusion-based moulding process forming at least one laminate structure 7, 8 from the panel core 15, the first laminate layer 25 and the second laminate layer 26.

It is possible that one or more further electrical conductors 14 are connected prior to the casting of the wind turbine blade 2 to the at least one connection terminal element 12 provided for casting of the wind turbine blade 2 and/or to the at least one connection terminal element 12 provided as a part of at least one pre-casted wind turbine component. This may occur in particular for further electrical conductors 14 that are arranged in areas comprising a limited space in the interior of the wind turbine blade 2, for instance in the tip region of the wind turbine blade, in order to prevent a difficult and/or cumbersome connection after the casting of the entire wind turbine blade 2. A further electrical conductor 14 connected to at least one connection terminal element 14 prior to the casting of the wind turbine blade may be covered at least partly by an additional laminate layer, for instance a glass fibre ply, to fix its position during the subsequent casting process.

In step S6, after casting of the wind turbine blade 2, at least one further electrical conductor 14 may be connected to the second connection portion 18 of the connection terminal element 12. This may occur alternatively or in addition to the connection of further electrical conductors 14 prior to the casting of the wind turbine blade 2 described in conjunction with step S5.

For connecting the further electrical conductors 14, the first laminate layer 25 and/or the second laminate layer 26 adjacent to the second connection portion 18 may comprise a hole or opening for connecting the further connector 14 to the second connection portion 18. It is possible that the hole is drilled into the first laminate layer 25 and/or the second laminate layer 26 after casting of the wind turbine blade 2. A hole, in particular a threaded hole, may also be drilled in one or more second connection portions 18 of the connection terminal elements 12 after the casting of the wind turbine blade 2, or the wind turbine component, respectively.

The possibility to connect a further electrical conductor 14 to the connection terminal elements 12 after the casting of the wind turbine blade 2 facilitates the production process of the wind turbine blade 2. In addition, the further electrical cables 14 may easily be repaired, for instance after a lightning strike causing damage to the wind turbine blade 2. It is possible that multiple first laminate layers 25 and/or multiple second laminate layers 26 are applied during a casting step and/or during a plurality of subsequent casting steps.

The arrangement of the connection terminal element 12 in the panel core 15 as well as the attachment of the embedded electrical conductor 19, 33 and the connection of the further electrical cable 14 may occur in particular as previously described with regard to the wind turbine blade 2. In particular, both the shell 9 and one or more web structures 10 comprising each a plurality of embedded electrical conductors 19, 33 and a plurality of connection terminal elements 12 may be fabricated forming the wind turbine blade 2.

It is possible that also a pre-casted component comprising at least one connection terminal element 12, for instance a pre-casted web structure 10, is provided and arranged with respect to the laminate structure 7, 8, wherein after casting of the wind turbine blade 2, also the second connection portion of the connection terminal element 12 of the pre-casted component is connected to or a further electrical conductor 19, 33.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade comprising:
  at least one laminate structure; and
  at least one connection terminal element;
  wherein the at least one laminate structure comprises a panel core, at least one first laminate layer, and at least one second laminate layer, the panel core being embedded between the at least one first laminate layer and the at least one second laminate layer;
  wherein the at least one connection terminal element is arranged in a corresponding opening of the panel core between the at least one first laminate layer and the at least one second laminate layer, and comprises at least one unitary first connection portion located between the at least one first laminate layer and the at least one second laminate layer and directly connected to an embedded electrical conductor embedded in the at least one laminate structure and/or at least one second connection portion adapted to be connected to at least one further electrical conductor arranged outside of the at least one laminate structure;
  wherein on at least one side of the at least one connection terminal element, the at least one unitary first connection portion is arranged between two second connection portions or the at least one second connection portion is arranged between two first connection portions.

2. The wind turbine blade according to claim 1, wherein the embedded electrical conductor is an elongated cable conductor and/or a conductive fibre layer and/or the embedded electrical conductor is arranged between the panel core and the at least one first laminate layer or the at least one second laminate layer of the at least one laminate structure.

3. The wind turbine blade according to claim 1, wherein the embedded electrical conductor is connected to a lightning receptor and/or an at least partly conductive portion of a shell of the wind turbine blade and/or to a spar of the wind turbine blade and/or the embedded conductor is a ground conductor of a lightning arrester of the wind turbine blade.

4. The wind turbine blade according to claim 1, wherein the at least one laminate structure forms at least a portion of a shell of the wind turbine blade and/or at least a portion of a web structure arranged in an interior of the wind turbine blade.

5. The wind turbine blade according to claim 1, wherein the panel core comprises at least one tilted recess adjacent to the corresponding opening, further wherein a portion of the embedded electrical conductor is arranged in the at least one tilted recess.

6. The wind turbine blade according to claim 1, wherein the corresponding opening in the panel core is a recess or a through-hole.

7. The wind turbine blade according to claim 1, wherein a panel core spacer component is arranged in the corresponding opening adjacent to the at least one connection terminal element, wherein a thickness of the panel core spacer component and at least a portion of the at least one connection terminal element is equal or essentially equal to the thickness of the panel core between the at least one first laminate layer and the at least one second laminate layer.

8. The wind turbine blade according to claim 1, wherein the at least one second connection portion comprises at least one spacer element protruding from the at least one second connection portion at least through the at least one first laminate layer and/or the at least one second laminate layer, wherein the at least one spacer element is adapted to be connected to the further electrical conductor.

9. The wind turbine blade according to claim 1, wherein the embedded electrical conductor is fixed to the at least one first connection portion of the at least one connection terminal element by a bolted connection and/or the at least one second connection portion is adapted to be connected to the further electrical conductor by a bolted connection.

10. The wind turbine blade according to claim 1, wherein the at least one first connection portion and the at least one second connection portion are arranged on a same side of the at least one connection terminal element or one or more first connection portions and/or one or more second connection portions are arranged on two opposing sides of the at least one connection terminal element.

11. A wind turbine comprising at least one wind turbine blade according to claim 1.

12. A method for fabrication of a wind turbine blade component comprising:
  providing at least one panel core, at least one first laminate layer, at least one second laminate layer and at least one connection terminal element;
  arranging the at least one connection terminal element in a corresponding opening of the at least one panel core;
  arranging the first laminate layer and the second laminate layer on two opposing sides of the at least one panel core embedding the at least one connection terminal element at least partly, wherein the at least one connection terminal element comprises at least one unitary first connection portion located between the first laminate layer and the second laminate layer and directly connected to an embedded electrical conductor embedded between the first laminate layer and the second laminate layer, wherein on at least one side of the at least one connection terminal element, the at least one unitary first connection portion is arranged between two second connection portions or at least one second connection portion is arranged between two first connection portions; and casting the wind turbine blade component.

13. The method according to claim 12, wherein the embedded electrical conductor is provided, wherein the embedded electrical conductor is connected to the at least one unitary first connection portion of the connection terminal element and arranged between the at least one panel core and the first laminate layer and/or the second laminate layer prior to the casting of the wind turbine blade component.

14. The method according to claim 12, wherein the wind turbine component is a part of a shell and/or a spar and/or a web.

15. A wind turbine blade comprising:

at least one laminate structure; and at least one unitary connection terminal element comprising a first connection portion and at least one second connection portion directly adjacent the first connection portion;

wherein the at least one laminate structure comprises a panel core, at least one first laminate layer, and at least one second laminate layer, the panel core being embedded between the at least one first laminate layer and the at least one second laminate layer;

wherein the at least one unitary connection terminal element is arranged in a corresponding opening of the panel core between the at least one first laminate layer and the at least one second laminate layer, the first connection portion being located between the at least one first laminate layer and the at least one second laminate layer and directly connected to an embedded electrical conductor embedded in the at least one laminate structure and the at least one second connection portion being adapted to be connected to at least one further electrical conductor arranged outside of the at least one laminate structure.

\*    \*    \*    \*    \*